(12) United States Patent
Shibata

(10) Patent No.: US 6,650,713 B1
(45) Date of Patent: Nov. 18, 2003

(54) MAXIMUM LIKELIHOOD SEQUENCE ESTIMATION APPARATUS

(75) Inventor: Takayuki Shibata, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/557,825

(22) Filed: Apr. 25, 2000

(30) Foreign Application Priority Data

Apr. 28, 1999 (JP) .......................................... 11-122561

(51) Int. Cl.[7] .................................................. H03D 1/00
(52) U.S. Cl. ........................ 375/341; 375/262; 714/794
(58) Field of Search ................................ 375/341, 262; 714/794, 795

(56) References Cited

U.S. PATENT DOCUMENTS

| | | | | |
|---|---|---|---|---|
| 5,081,651 A | * | 1/1992 | Kubo | 375/341 |
| 5,444,721 A | * | 8/1995 | Okanoue et al. | 375/341 |
| 5,644,603 A | * | 7/1997 | Ushirokawa | 375/341 |
| 6,215,832 B1 | * | 4/2001 | Hitosi | 375/341 |

FOREIGN PATENT DOCUMENTS

| | | |
|---|---|---|
| JP | 11-8573 | 1/1999 |
| JP | 11-8575 | 1/1999 |

* cited by examiner

*Primary Examiner*—Temesghen Ghebretinsae
(74) *Attorney, Agent, or Firm*—Foley & Lardner

(57) ABSTRACT

A maximum likelihood sequence estimation (MLSE) apparatus which can estimate a maximum likelihood sequence (MLS) correctly, even when an optimum range of an impulse response is changed, includes a range setting device for selecting an optimum range in the impulses detected by an impulse response detector. The MLSE apparatus estimates the MLS by using the impulses in the optimum range as the tap coefficients which are renewed by adaptive estimation in an adaptive control device. The range setting device renews the optimum range, every time the tap coefficients are renewed. The adaptive control device sets up the impulses in the optimum range as the tap coefficients in MLSE means. The MLSE apparatus estimates MLS on the basis of the impulses in the optimum range.

6 Claims, 4 Drawing Sheets

MAXIMUM LIKELIHOOD SEQUENCE ESTIMATION APPARATUS

BACKGROUND OF THE INVENTION

1. Technical Field of the Invention

The present invention relates to a maximum likelihood estimation apparatus which estimates a maximum likelihood sequence of received signal distorted by multi-path fading in digital mobile communication system, and further estimates adaptively an impulse response of transmission channel.

2. Description of the Prior Art

Transmission quality in the digital mobile communication is degraded by the inter-symbol interference due to the multi-path on transmission channels. The maximum likelihood sequence estimation (MLSE) by Viterbi algorithm is known as one of useful means for estimating the original transmission sequence on the basis of the distorted signal suffering the inter-symbol interference. MLSE has in general a disadvantage that massive signal processing is required, although its equalizing capability is high. The quantity of signal processing is decided by the state number in Viterbi algorithm or the number of taps of MLSE means. The multi-path delay in symbol becomes great, as the transmission rate for multi-media mobile communication becomes high. Therefore, vast calculations are required, if the number of taps is decided by the maximum delay. The number of taps must be suppressed, if quantity of calculations is reduced. However, only a limited part of the impulse response of transmission channel is calculated under the limited calculation capability. Therefore, it is necessary to consider which range of the impulse response is used for the tap coefficients which yield a greater electric power in that range and higher estimation capability.

A conventional technique for selecting optimum range in the impulse response of transmission line is disclosed in JP 11-8575 A (1999) as shown in FIG. 4.

A block diagram of a maximum likelihood sequence estimation receiver as disclosed in JP 11-8575 A (1999) is shown in FIG. 4. An impulse response of a transmission channel is obtained in transmission characteristics detector 21, when a training signal such as a pseudo-noise (PN) code sequence is received. The impulse response is outputted towards range setting means 22 and maximum likelihood estimation means 23. Range setting means 22 decides a range in the impulse response for setting up the tap coefficients, and outputs timing signal towards maximum likelihood sequence estimation means (MLSE) means 23. MLSE means 23 estimates a maximum likelihood sequence under the Viterbi algorithm by using as many impulses as the number of taps from the head as indicated by the timing signal. Circuit of range setting means 22 is made small by employing amplitude calculation in place of power calculation. Concretely, absolute value calculation means 24 obtains amplitudes of impulse response, then, accumulator 25 accumulates as many amplitudes as the number of taps, and further, obtains the accumulation value for one period of the training signal, by shifting the impulse response. Maximum value detecting means 26 generates a timing signal by detecting a position where the accumulation value becomes maximum.

However, it becomes difficult to estimate correctly the maximum likelihood sequence, when the impulse response obtained by using the training signal becomes different greatly from the actual transmission characteristics as time goes by. Therefore, adaptive algorithm such as least mean square (LMS) and recursive least squares (RLS) are employed, when the transmission characteristics change greatly, depending on time. However, even when the adaptive estimation is employed, the selected range of the impulses for setting up the tap coefficients remains unchanged. Therefore, the estimation of maximum likelihood sequence becomes incorrect, when the optimum range for determining the impulse response changes.

SUMMARY OF THE INVENTION

An object of the present invention is to renew adaptively the impulse response as well as to renew adaptively the optimum range of the impulse response, in order to estimate correctly the maximum likelihood sequence.

The maximum likelihood sequence estimation apparatus of the present invention decides an optimum range of the impulse response, every time when the impulse response is estimated adaptively, and further decides received signal used for the adaptive estimation of the impulse response and the maximum likelihood sequence estimation.

According to the present invention, MLSE is executed by using the impulses at the optimum range, even when the optimum range of the impulses is changed in time. Therefore, the MLSE apparatus of the present invention estimates correctly the maximum likelihood sequence.

PREFERRED EMBODIMENT OF THE INVENTION

Figure 1:
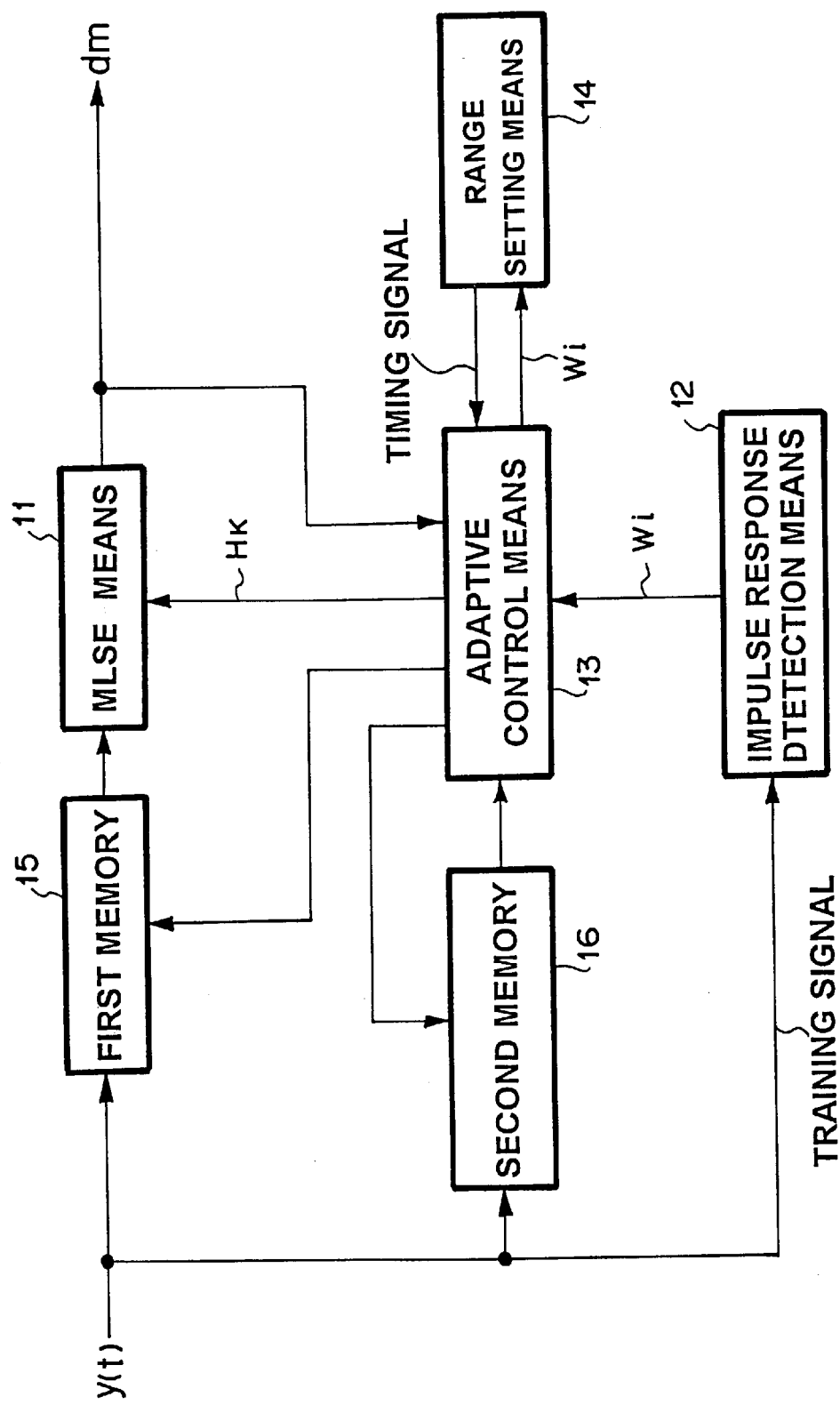
FIG. 1 is a block diagram of the maximum likelihood sequence estimation (MLSE) apparatus of the present invention.

A block diagram of the maximum likelihood sequence estimation (MLSE) apparatus of the present invention is shown in FIG. 1. Impulse response detection means 12 in MLSE apparatus of the present invention detects an impulse response of transmission line from training signal included in the received signal. Here, the received signal includes known training signal and unknown data signal. Here, the training signal may be, for example, several periods of pseudo-noise (PN) codes. In this case, the impulse response is obtained by calculating correlation between PN code and received several periods of PN codes as the training signal.

The detected impulse response is inputted into range setting means 14, through adaptive control means 13.

Range setting means 14 sets up an optimum range on the basis of the impulse response, and sends to adaptive control means 13 a timing signal which indicates the first position of the impulse response in the optimum range. Adaptive control means 13 generates a first and second control signal for controlling first received signal memory 15 and second received signal memory 16, respectively. The output signal from second received signal memory 16 is delayed by time "t", compared with the output from first received signal memory 15.

MLSE means 11 outputs MLS on the basis of tap coefficients outputted from adaptive control means 13. MLSE means 11 convolutes "j" candidates symbols with said "j" impulses $w_p, w_{p+1}, \ldots, w_{p+j-1}$ which maximize $(w_p^2 + w_{p+1}^2 + \ldots + w_{p+j-1}^2)$, among "N" impulses $w_0, w_1, \ldots, w_{N-1}$. Here, the "j" tap coefficients are the "j" impulses which are obtained by correlation of "N" pseudo noise codes for the training signal and the received training signal included in the received signal. Here, the indices subscripts of "w" are replaced by the indices of "w" subtracted by "N", when the indices of "w" is greater than or equal to "N".

Thus, MLSE means 11 estimates a maximum likelihood sequence on the basis of the result of convolution and the received signal outputted from the first memory 15.

Figure 2:
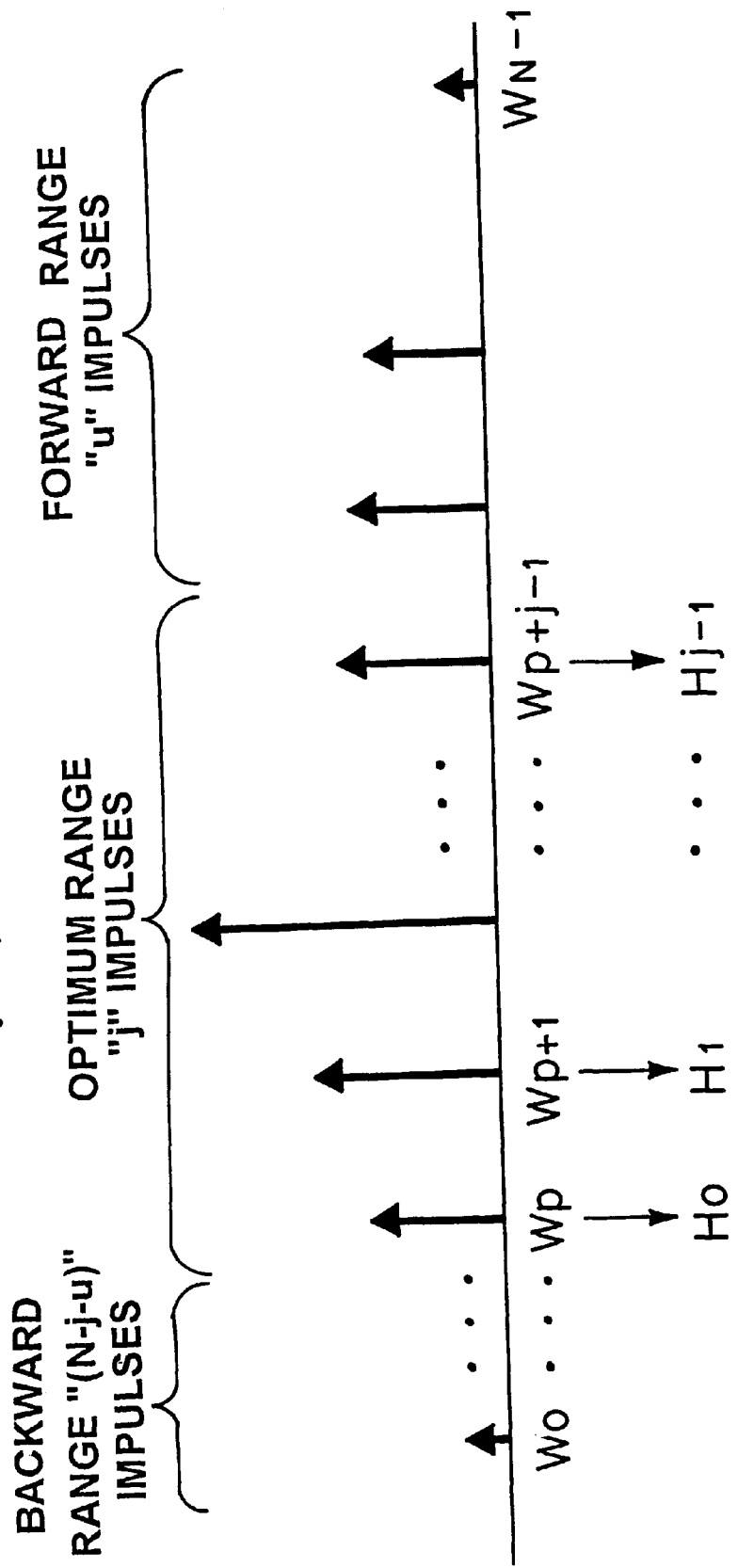
FIG. 2 is an example of an optimum range at the time "n" including "j" impulses in a series of N impulses $w_0$ to $w_{N-1}$. The timing signal is "p" at the position of the impulse "$w_p$". Therefore, the backward range consists of $w_0$ to $w_{p-1}$, while the forward range consists of $w_{p+j}$ to $w_{N-1}$. The length of the forward range is "u".

A timing chart for explaining the operation of MLSE apparatus of the present invention is shown in FIG. 2. PN code of which length in one period is N (N: natural number) is used for the training signal.

More concretely, impulse response detection means 12 detects N impulses $(w_0, w_1, \ldots, w_{N-1})$. It is supposed hereinafter that $w_{q+i\,N}$ is equal to $w_q$, where "i" and "q" is integer, respectively, and $0 \leq q < (N-1)$). The N impulses are inputted into adaptive control means 13 and range setting means 14. Range setting means 14 calculates accumulated power for a range of "j" successive impulses, where "j" (j: natural number, j<N) is the number of taps. Then, the range which makes the accumulated power maximum is determined to be an optimum range. Concretely, $M_0, M_1, \ldots, M_{N-1}$ are calculated, where $$M_0 = w_0^2 + w_1^2 + \ldots + w_{j-1}^2$$

$$M_1 = w_1^2 + w_2^2 + \ldots + w_j^2$$

$$\ldots$$

$$M_{N-1} = w_{N-1}^2 + w_0^2 + \ldots + w_{j-2}^2$$

When $M_p$ (p: integer, $0 \leq p < (N-1)$) is maximum, "j" impulses $(w_p, w_{p+1}, \ldots, w_{p+j-1})$ are determined to be the optimum range. Here, when the indices subscript of w is greater than or equal to N, they are replaced by the incices subscript subtracted by N.

Adaptive control means 13 outputs "j" tap coefficients $(w_p, w_{p+1}, \ldots, w_{p+j-1})$ toward MLSE means 11.

Adaptive control means 13 also outputs, toward received signal memory 15, a first timing on the basis of the timing signal TS outputted from range setting means 14. The first timing controls the output timing of received signal, in accordance with processing timing of MLSE.

MLSE means 11 generates a replica of the received signal by executing convolution operation combining "j" candidate symbols with "j" tap coefficients inputted from adaptive control means 13. MLSE means 11 then estimates the original transmission signal by Viterbi algorithm, on the basis of the replica and the received signal outputted from received signal memory 15.

Adaptive control means 13 estimates an impulse response by adaptive algorithm, on the basis of the output from MLSE means 11 and the received signal outputted from received signal memory 16. Further, adaptive control means 13 outputs a second timing toward received signal memory 16, in accordance with the processing timing of the adaptive estimation of impulse response. Here, the second timing is defined by (the first timing—t). Namely, the second timing is the first timing subtracted by "t", where "t" is equal to (j+u), where "j" is a tap length of MLSE means and "u" is a length of the forward range as shown in FIG. 2;

Adaptive control means 13 renews the "j" tap coefficients or impulses in the optimum range as well as the "(N−j)" impulses outside the range. The renewed "N" impulses are outputted toward range setting means 14.

Range setting means 14 determines the optimum range and outputs a renewed timing signal TSRN. When the renewed timing signal TSRN coincides with the timing signal TS before the renewal, adaptive control means outputs the renewed impulses as the tap coefficients toward MLSE means 11.

On the other hand, when the renewed timing signal TSRN does not coincides with the timing signal before the renewal TS, impulses in a range designated by the renewed timing signal TSRN are outputted toward MLSE means 11.

Further, a timing signal TS at time "n" and a timing signal TS at time "(n+1)" are explained.

It is assumed that at time "n" (n: integer, $n \geq 0$) "j" tap coefficients of MLSE means 11 and adaptive control means 13 are $H_k(n)$ (k: integer, $0 \leq k \leq (j-1)$), and "N" impulses are $w_m(n)$ (m: integer, $0 \leq m \leq (N-1)$). When the timing signal from range setting means 14 is "p" at time "0", $H_k(0)$ is equal to $w_k + p(0)$, where (k+p) is replaced by (k+p−N), when $(k+p) \geq N$.

When the optimum range is not changed up to the time "n", $H_k(n)$ is equal to $w_{k+p}(n)$. MLSE means 11 estimates the MLS on the basis of replica $r_p(n)$ and received signal y(n) in order to output determination value "dm" as shown in FIG. 1. Replica $r_p(n)$ is expressed in terms of $H_k(n)$ and $s_n$.

$$r_p(n) = H_0(n) \cdot s_n + H_1(n) \cdot s_{n-1} + \ldots + H_{j-1}(n) \cdot s_{n-j+1}$$

$$= w_p(n) \cdot s_n + w_{p+1}(n) \cdot s_{n-1} + \ldots + w_{p+j-1}(n) \cdot s_{n-j+1},$$

where Sk ($n-j+1 \leq k \leq n$) is a candidate sequence.

Adaptive control means 11 renews the tap coefficients, by using the determination value outputted from MLSE means 11 before the time (n−1). Conventionally, the tap coefficients $H_k(n+1)$ at the time (n+1) are renewed on the basis of replica $r_p(n-j)$ and received signal y(n−j), when LMS is used as the adaptive algorithm.

A conventional formula for renewing the tap coefficients $H_k(n+1)$ is as follows.

$$H_k(n+1) = H_k(n) + \mu \cdot e_p(n-j) \cdot d_{n-j-k},$$

where:

$\mu$ is a step parameter;

$$e_p(n-j) = y(n-j) - r_p(n-j);$$

$d_{n-j-k}$ is a determination value outputted from MLSE means 11; and $$r_p(n-j) = H_0(n) \cdot d_{n-j} + H_1(n) \cdot d_{n-j-1} + \ldots + H_{j-1}(n) \cdot d_{n-2j+1}$$

$$= w_p(n) \cdot d_{n-j} + w_{p+1}(n) \cdot d_{n-j-1} + \ldots + w_{p+j-1}(n) \cdot d_{n-2j+1}$$

On the other hand, in adaptive control means 11 of the present invention, all of the "N" impulses are renewed. Concretely, when "j" tap coefficients are set up, "u" impulses among "(N−j) impulses are deemed to be impulses in front of the optimum range, and the rest are deemed to be impulses behind the optimum range.

Therefore, in the present invention, impulse response $w_{p+a}(n+1)$ at the time "(n+1)" is renewed according to the following formula.

$$w_{p+a}(n+1)=w_{p+a}(n)+\mu \cdot e_p(n-t) \cdot d_{n-t-a},$$

where:

"a" is an integer;

$t=j+u;$ $-u \leq a \leq -u+N-1;$ $\mu$ is a step parameter;

$e_p(n-t)=y(n-t)-r_p(n-t);$ and $$r_p(n-t) = H_0(n) \cdot d_{n-t} + H_1(n) \cdot d_{n-t-1} + \ldots + H_{j-1}(n) \cdot d_{n-t-j+1}$$
$$= w_p(n) \cdot d_{n-t} + w_{p+1}(n) \cdot d_{n-t-1} + \ldots + w_{p+j-1}(n) \cdot d_{n-t-j+1}$$

The renewed impulses $w_{p+a}(n+1)$ are outputted toward range setting means 14. As shown in the above formula, y(n−t) is a received signal used for the adaptive estimation at the time "n". Therefore, received signal memory 16 is controlled so as to output received signal which is shifted by time t in comparison with the received signal in received signal memory 15.

Range setting means 14 outputs a timing signal of the optimum range of the renewed impulses, by calculating accumulation value of powers of "j" straight impulses. When the optimum range has not been changed up to the time "n", the timing signal is "p". Further, when the optimum range has not been changed after the renewal of the tap coefficients, the timing signal is "p". In this case, the tap coefficient $H_k(n+1)$ is equal to $w_{k+p}(n+1)$.

Figure 3:
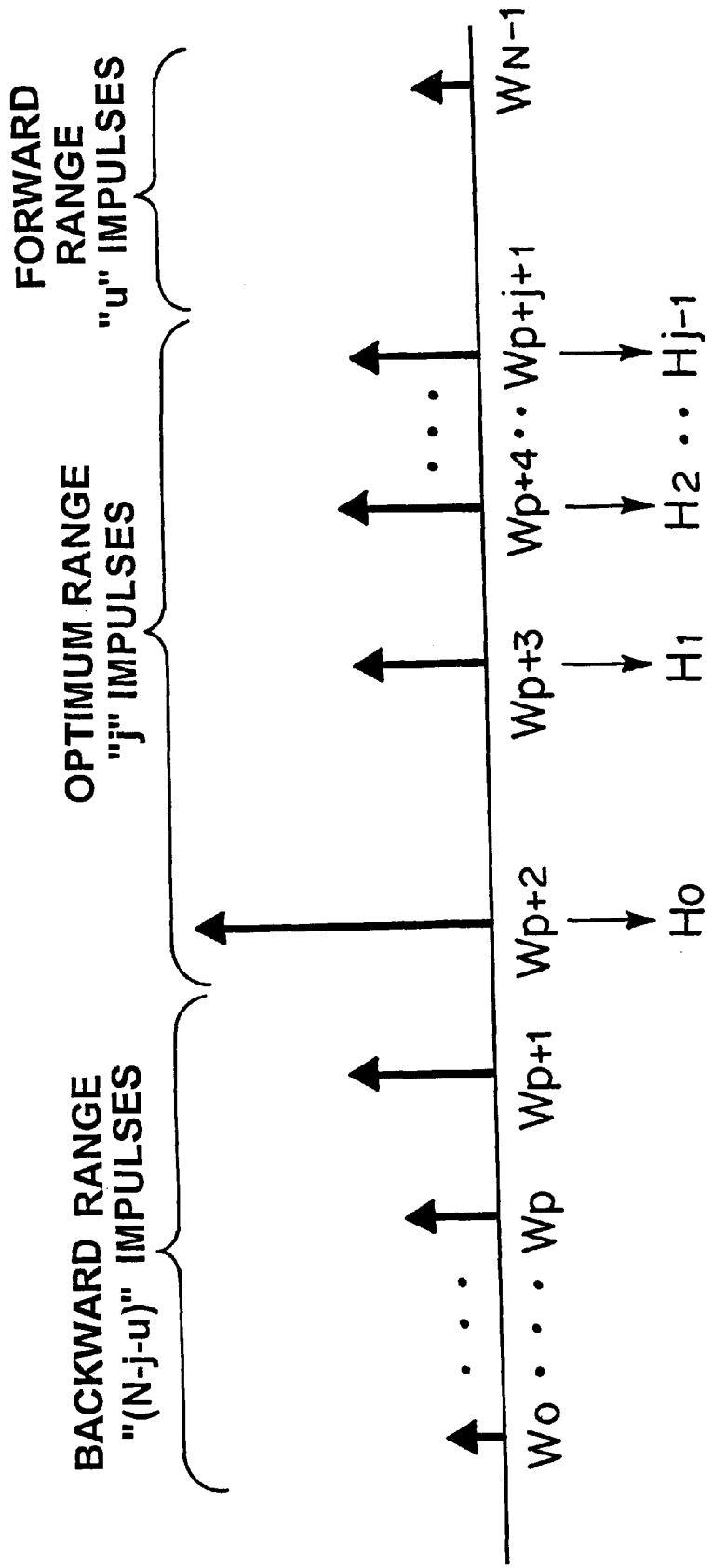
FIG. 3 is an example of an optimum range at the time "(n+1)" including "j" impulses in a series of N impulses $w_0$ to $W_{N-1}$. The timing signal is "(p+2)" at the position of the impulse "$w_{p+2}$".
Figure 4:
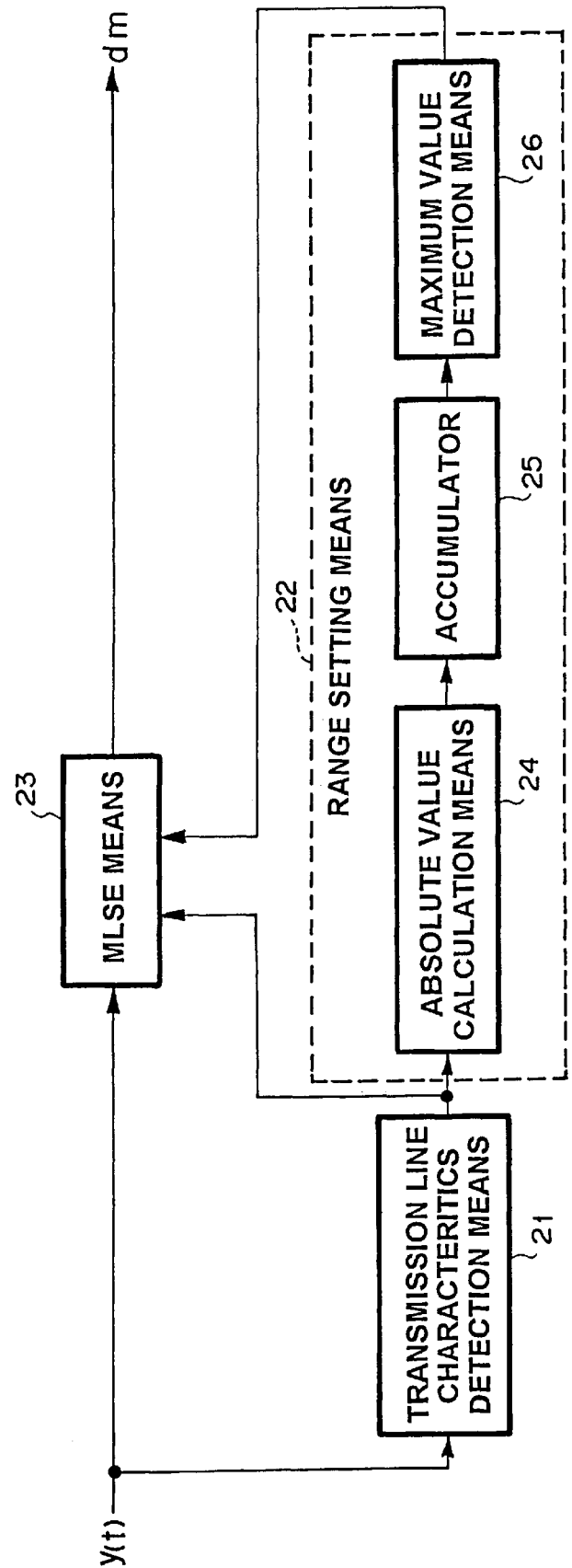
FIG. 4 is a block diagram of a conventional MLSE apparatus.

However, when the optimum range is changed to $w_{p+2}(n+1) \sim w_{p+j+2}(n+1)$, the timing signal becomes "(p+2)", as shown in FIG. 3. In this case, the tap coefficient $H_k(n+1)$ is set up to be to $w_{k+p+2}(n+1)$. Therefore, the tap coefficients used for adaptive MLSE are shifted by two taps. Therefore, the received signal should be shifted by two symbols, when MLSE is executed by using the shifted tap coefficients, succeeding the path metric and path memory up to the time "n". Therefore, received signal memory 15 outputs, not received signal y(n+1), but received signal y(n+3) at the time "(n+1)", while received signal memory 16 outputs, not received signal y(n+1−t), but received signal y(n+3−t) at the time "(n+1)".

In this case, MLSE means 11 estimates MLS on the basis of replica $r_{p+2}$ (n+3) and received signal y (n+3) at the time "(n+1)", and outputs the determination value "dm"as shown in FIG. 1.

Therefore, replica $r_{p+2}$ (n+3) is expressed as follows:

$$r_{p+2}(n+3) = H_0(n+1) \cdot s_{n+1} + H_1(n+1) \cdot s_n + \ldots + H_{j-1}(n+1) \cdot s_{n-j+2}$$
$$= w_{p+2}(n+1) \cdot s_{n+1} + w_{p+3}(n+1) \cdot s_n + \ldots + w_{p+j+1}(n+1) \cdot s_{n-j+2}$$

Adaptive control means 13 renews the impulses on the basis of replica $r_{p+2}$ (n+3−t) and received signal y (n+3−t).

Impulses $w_{p+2+a}(n+2)$ are renewed according to the following formula, when the timing signal is moved backward.

$$w_{p+2+a}(n+2)=w_{p+2+a}(n+1)+\mu \cdot e_{p+2}(n+3-t) \cdot d_{n+1-t-a},$$

where:

"a" is an integer;

$t=j+u;$ $-u \leq a \leq -u+N-1;$ $\mu$ is a step parameter;

$e_{p+2}(n+3-t)=y(n+3-t)-r_{p+2}(n+3-t);$ and $$r_{p+2}(n+3-t) = H_0(n+1) \cdot d_{n-t+1} + H_1(n+1) \cdot d_{n-t} + \ldots + H_{j-1}(n+1) \cdot d_{n-t-j+2}$$
$$= w_{p+2}(n+1) \cdot d_{n-t+1} + w_{p+3}(n+1) \cdot d_{n-t} + \ldots + w_{p+j+1}(n+1) \cdot d_{n-t-j+2}$$

Further, for example, when the optimum range becomes $w_{p-2}(n+1) \sim w_{p+j-3}(n+1)$, the timing signal becomes "(p−2)". Adaptive control means 13 sets up tap coefficients $H_k(n+1)$ to be $w_{k+p-2}(n+1)$, because the timing signal is changed to "(p−2)". Further, received signal memory 15 outputs, not y (n+1), but y (n−1), while received signal memory 16 outputs, not y (n+1−t), but y (n−1−t).

In this case, MLSE means 11 estimates MLS on the basis of replica $r_{p-2}$ (n−1) and received signal y (n−1), and outputs the estimation result $d_{n-j+2}$.

Replica $r_{p-2}$ (n−1) is expressed as follows, when the timing signal is moved forward.

$$r_{p-2}(n-1) = H_0(n+1) \cdot s_{n+1} + H_1(n+1) \cdot s_n + \ldots + H_{j-1}(n+1) \cdot s_{n-j+2}$$
$$= w_{p-2}(n+1) \cdot s_{n+1} + w_{p-1}(n+1) \cdot s_n + \ldots + w_{p+j-3}(n+1) \cdot s_{n-j+2}$$

Further, the impulses $w_{p-2+a}(n+2)$ are expressed as follows:

$$w_{p-2+a}(n+2)=w_{p-2+a}(n+1)+\mu \cdot e_{p-2}(n-1-t) \cdot d_{n+1-t-a},$$

where:

"a" is an integer;

$t=j+u;$ $-u \leq a \leq -u+N-1;$ $\mu$ is a step parameter;

$e_{p-2}(n-1-t)=y(n-1-t)-r_{p-2}(n-1-t);$ and $$r_{p-2}(n-1-t) = H_0(n+1) \cdot d_{n-t+1} + H_1(n+1) \cdot d_{n-t} + \ldots + H_{j-1}(n+1) \cdot d_{n-t-j+2}$$
$$= w_{p-2}(n+1) \cdot d_{n-t+1} + w_{p-1}(n+1) \cdot d_{n-t} + \ldots + w_{p+j-3}(n+1) \cdot d_{n-t-j+2}$$

Adaptive control means 13 renews the impulses on the basis of replica $r_{p-2}$ (n−1−t) and received signal y (n−1−t).

What is claimed is:

1. A maximum likelihood sequence estimation (MLSE) apparatus for estimating a maximum likelihood sequence, which comprises:

a first and second memory for storing received signal;

an impulse response detection means for detecting impulses in training signal included in said received signal;

a range setting means for selecting an optimum range among said impulses and for renewing a timing signal (TS) on the basis of said optimum range and for outputting the renewed timing signal (TSRN);

an adaptive control means for controlling said first and second memory and for outputting "j" tap coefficients; and a MLSE means for estimating said maximum likelihood sequence on the basis of said "j" tap coefficients, wherein:

said first memory outputs, to said MLSE means, said received signal by using a first timing which is designated by said TSRN;

said second memory outputs, to said adaptive control means, said received signal by using a second timing which is defined by (said first timing—t), namely said first timing subtracted by "t", where "t" is equal to (j+u), where "j" is a tap length of said MLSE means and "u" is a length of a forward range in said adaptive control means;

said adaptive control means renews said impulses on the basis of said received signal outputted from said second memory, said maximum likelihood sequence outputted from said MLSE means, and said impulses in said optimum range outputted from said range setting means.

2. The MLSE apparatus according to claim 1, wherein said MLSE means estimates the maximum likelihood sequence on the basis of: the output from said first memory controlled by said adaptive control means into which the output from said MLSE means is fed; and the output from said adaptive control means controlled by said timing signal outputted from said range setting means.

3. The MLSE apparatus according to claim 1, wherein said optimum range consists of "j" impulses $w_{p+1}, \ldots, w_{p+j+1}$ which maximize $(w_p^2 + w_{p+1}^2 + \ldots + w_{p+j-1}^2)$, among "N" impulses $w_0, w_1, \ldots, w_{N-1}$, where said "j" impulses are obtained by correlation of "N" pseudo noise codes for said training signal and received training signal, where the indices subscripts of "w" are replaced by said indices of "w" subtracted by "N", when said indices of "w" is greater than or equal to "N".

4. The MLSE apparatus according to claim 3, wherein: said adaptive control means renews "N" impulses $w_{p-u}$, $w_{p-u+1}, \ldots, w_{p-u+N-1}$ on the basis of the impulses $w_p$, $w_{p+1}, \ldots, w_{p+j-1}$ in said optimum range which is set up by said range setting means, by using said length "u".

5. The MLSE apparatus according to claim 3, wherein said MLSE means executes convolution operation combining "j" candidate symbols and said "j" impulses $w_p$, $w_{p+1}, \ldots, w_{p+j-1}$ which maximize $(w_p^2 + w_{p+1}^2 + \ldots + w_{p+j-1}^2)$, among "N" impulses $w_0, w_1, \ldots, w_{N-1}$, where said "j" impulses are obtained by correlation of "N" pseudo noise codes for said training signal and received training signal, where the indices subscripts of "w" are replaced by said indices of "w" subtracted by "N", when said indices of "w" is greater than or equal to "N";

and estimates the maximum likelihood sequence on the basis of the result of said convolution operation.

6. A maximum likelihood sequence estimation method for estimating a maximum likelihood sequence on the basis of adaptively selected optimum range among impulses in a received training signal, which comprises the steps of:

for selecting said optimum range at time "n" consisting of "j" impulses $w_p, w_{p+1}, \ldots, w_{p+j-1}$ which maximize $(w_p^2 + w_{p+1}^2 \ldots w_{p+j-1}^2)$, among "N" impulses $w_0, w_1, \ldots, w_{N-1}$, where said "j" impulses are obtained by correlation of "N" pseudo noise codes for training signal and said received training signal, where the indices subscripts of "w" are replaced by said indices of "w" subtracted by "N", when said indices of "w" is greater than or equal to "N";

estimating said maximum likelihood sequence at time "n", by convoluting "j" candidate symbols with said "j" impulses;

for selecting impulses $w_{p-u}, w_{p-u+1}, \ldots, w_{p-u+N-1}$ at time "(n+1)" on the basis of said "j" impulses $w_p, w_{p+1}, \ldots, w_{p+j-1}$ in said optimum range, where "u" is a length of a forward range which consists of impulses $w_{p+j}, w_{p+j+1}, \ldots, w_{N-1}$;

selecting said optimum range at time "(n+1)" consisting of "j" impulses $w_q, w_{q+1}, \ldots, w_{q+j-1}$ which maximize $(w_q^2 + w_{q+1}^2 + \ldots + w_{q+j-1}^2)$, among "N" impulses $W_0, w_1, \ldots, w_{N-1}$, where said "j" impulses are obtained by correlation of "N" pseudo noise codes for training signal and said received training signal, where the indices subscripts of "w" are replaced by said indices of "w" subtracted by "N", when said indices of "w" is greater than or equal to "N"; and for estimating said maximum likelihood sequence at time "(n+1)", by convoluting "j" candidate symbols with said "j" impulses.

* * * * *